United States Patent
Dai et al.

(10) Patent No.: US 10,240,815 B2
(45) Date of Patent: Mar. 26, 2019

(54) EFFICIENT DISSOCIATION OF WATER VAPOR IN ARRAYS OF MICROCHANNEL PLASMA DEVICES

(71) Applicant: The Board of Trustees of the University of Illinois, Urbana, IL (US)

(72) Inventors: Zhen Dai, Urbana, IL (US); Thomas J. Houlahan, Urbana, IL (US); J. Gary Eden, Champaign, IL (US); Sung-Jin Park, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 165 days.

(21) Appl. No.: 15/150,107

(22) Filed: May 9, 2016

(65) Prior Publication Data
US 2016/0327310 A1    Nov. 10, 2016

Related U.S. Application Data

(60) Provisional application No. 62/158,657, filed on May 8, 2015.

(51) Int. Cl.
  *F24H 1/18* (2006.01)
  *B01J 19/08* (2006.01)
  (Continued)

(52) U.S. Cl.
  CPC .......... *F24H 1/186* (2013.01); *B01J 19/0093* (2013.01); *B01J 19/088* (2013.01); *C01B 3/045* (2013.01); *C01B 13/0207* (2013.01); *B01J 2219/0084* (2013.01); *B01J 2219/0086* (2013.01); *B01J 2219/00786* (2013.01);
  (Continued)

(58) Field of Classification Search
  None
  See application file for complete search history.

(56) References Cited

U.S. PATENT DOCUMENTS 6,194,833 B1    2/2001  DeTemple et al.
7,482,750 B2    1/2009  Eden et al.
(Continued)

OTHER PUBLICATIONS

Lozano-Parada et al., "The role of kinetics in the design of plasma microreactors", Chemical Engineering Science 65(17):4925-4930, 2010.*
Xiao Chen et al., "H2O Splitting in Tubular PACT (Plasma and Catalyst Integrated Technologies) Reactors", Journal of Catalysis, vol. 201, pp. 198-205, 2001.
J.H. Cho et al., "Propagation and decay of low temperature plasma packets in arrays of dielectric microchannels", Applied Physics Letters, vol. 101, 253508, Dec. 18, 2012.
(Continued)

*Primary Examiner* — Kishor Mayekar
(74) *Attorney, Agent, or Firm* — Greer, Burns & Crain, Ltd.; Steven P. Fallon

(57) ABSTRACT

The invention provides methods and systems for water dissociation with microplasma generated in microchannel plasma arrays or chips. Preferred methods and systems introduce water vapor into a microchannel plasma array. Electrical power is applied to the microchannel plasma array to create a plasma chemical reaction of the water vapor in the microchannel plasma array. Dissociated hydrogen and/or oxygen gas is collected at an output of the microchannel plasma array. The water vapor can be entrained in a carrier gas, but is preferably introduced without carrier gas. Direct introduction of water vapor has been demonstrated to provide efficiencies at an above 60%. The use of carrier gas reduces efficiency, but still exceeds efficiencies of prior methods discussed in the background.

11 Claims, 12 Drawing Sheets

(51) Int. Cl.
  *C01B 3/04* (2006.01)
  *B01J 19/00* (2006.01)
  *C01B 13/02* (2006.01)

(52) U.S. Cl.
  CPC .............. *B01J 2219/00795* (2013.01); *B01J 2219/00824* (2013.01); *B01J 2219/00853* (2013.01); *B01J 2219/00959* (2013.01); *B01J 2219/0841* (2013.01); *B01J 2219/0894* (2013.01); *C01B 2203/0861* (2013.01); *Y02E 60/364* (2013.01)

(56) References Cited

U.S. PATENT DOCUMENTS

| | | | |
|---|---|---|---|
| 7,573,202 | B2 | 8/2009 | Eden et al. |
| 8,442,091 | B2 | 5/2013 | Park et al. |
| 8,492,744 | B2 | 7/2013 | Eden et al. |
| 8,497,631 | B2 | 7/2013 | Eden et al. |
| 8,547,004 | B2 | 10/2013 | Eden et al. |
| 8,864,542 | B2 | 10/2014 | Eden et al. |
| 8,870,618 | B2 | 10/2014 | Eden et al. |
| 8,890,409 | B2 | 11/2014 | Eden et al. |
| 8,968,668 | B2 | 3/2015 | Eden et al. |
| 9,390,894 | B2 | 7/2016 | Eden et al. |
| 2013/0071297 | A1 | 3/2013 | Eden et al. |
| 2014/0360862 | A1* | 12/2014 | Malik ............... C01B 3/342 204/165 |

OTHER PUBLICATIONS

Yong Ho Jung et al., "Hydrogen Generation from the Dissociation of Water Using Microwave Plasmas", Chinese Physics Letters, vol. 30, No. 6, 065204, 2013.

Hajime Kabashima et al., "Hydrogen Generation from Water with Nonthermal Plasma", Chemistry Letters, vol. 30, No. 12, pp. 1314-1315, 2001.

M.H. Kim et al., "Efficient generation of ozone in arrays of microchannel plasmas", Journal of Physics D: Applied Physics, vol. 46, 305201, 2013.

Nazim Z. Muradov and T. Nejat Veziroglu, "'Green' path from fossil-based to hydrogen economy: An overview of carbon-neutral technologies", International Journal of Hydrogen Energy, vol. 33, pp. 6804-6839, Oct. 28, 2008.

Sonca V.T. Nguyen et al., "Operating a radio-frequency plasma source on water vapor", Review of Scientific Instruments, vol. 80, 083503, Aug. 24, 2009.

Fahad Rehman et al., "A kinetic model for H2 production by plasmolysis of water vapours at atmospheric pressure in a dielectric barrier discharge microchannel reactor", International Journal of Hydrogen Energy, vol. 37, pp. 17678-17690, Sep. 25, 2012.

Steven L. Suib et al., "Water Splitting in Low-Temperature AC Plasmas at Atmospheric Pressure", Res. Chem. Intermed., vol. 26, No. 9, pp. 849-874, 2000.

S.H. Sung et al., "Interchannel optical coupling within arrays of linear microplasmas generated in 25-200um wide glass channels", Applied Physics Letters, vol. 97, 231502, Dec. 9, 2010.

* cited by examiner

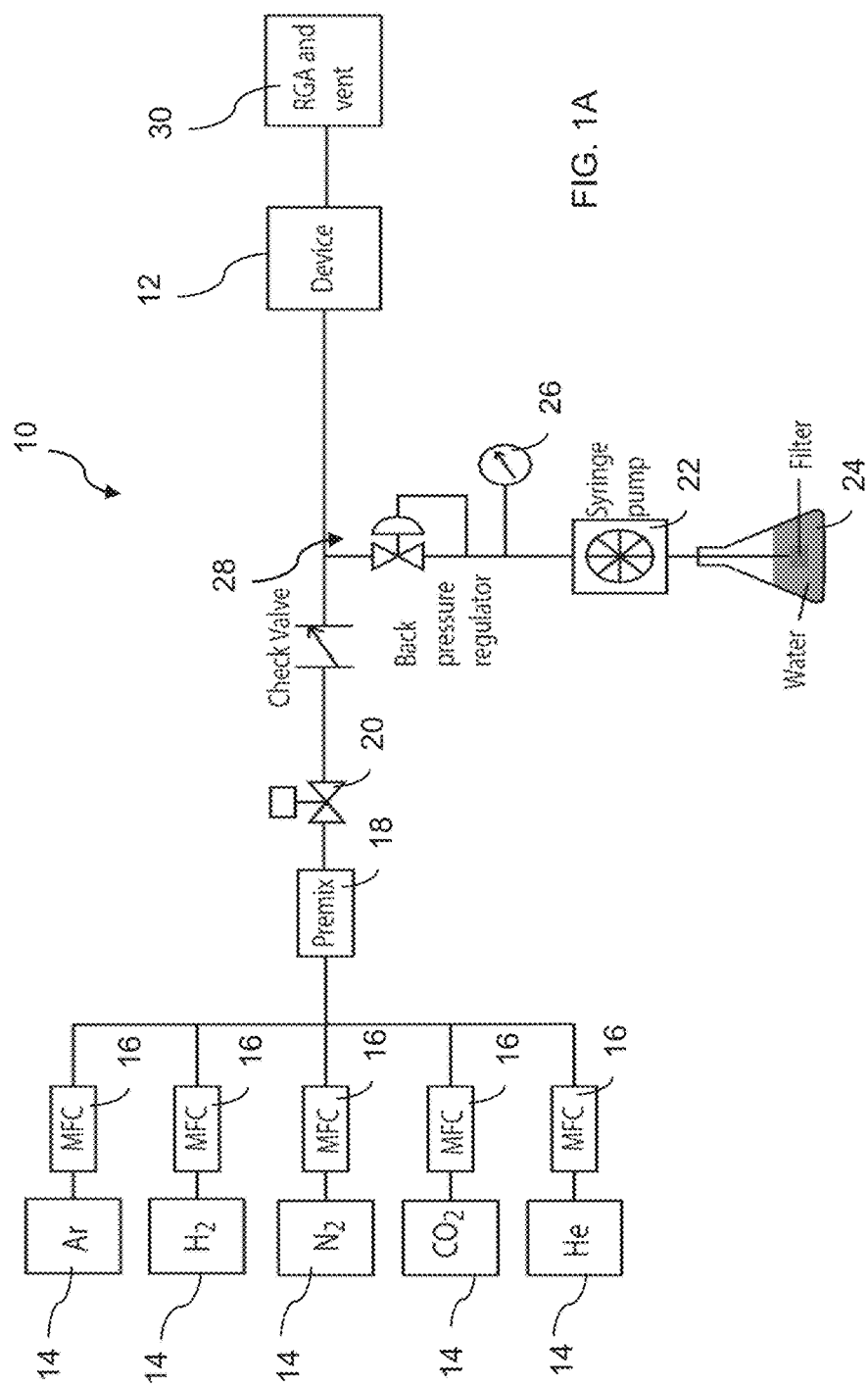

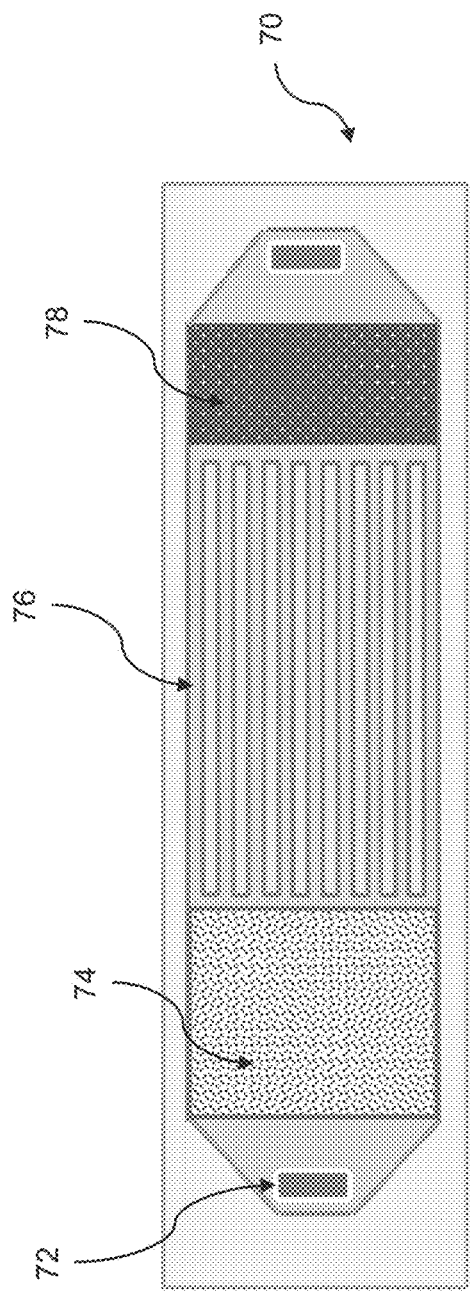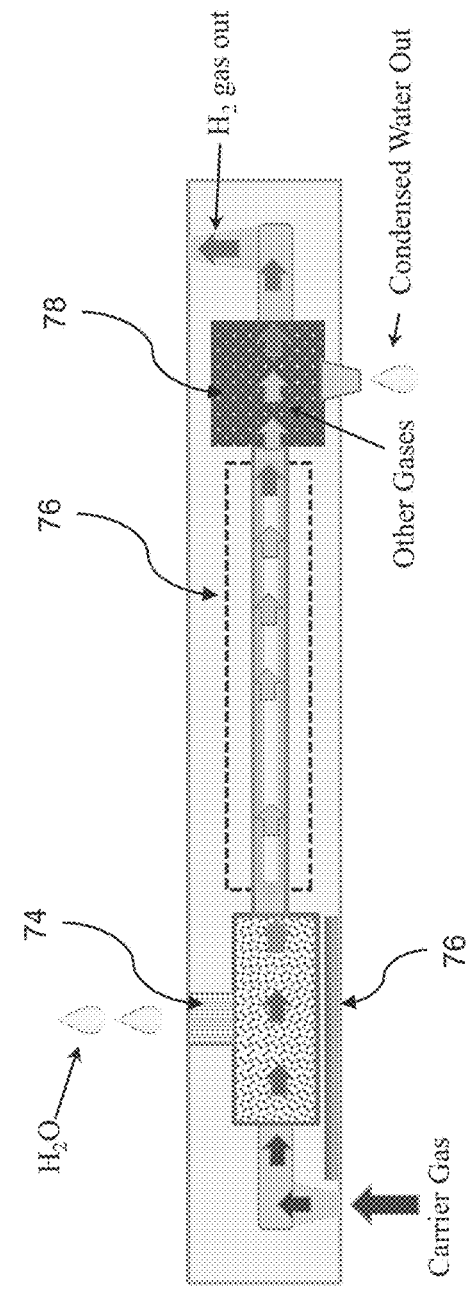
FIG. 6A
FIG. 6B

EFFICIENT DISSOCIATION OF WATER VAPOR IN ARRAYS OF MICROCHANNEL PLASMA DEVICES

STATEMENT OF GOVERNMENT INTEREST

This invention was made with government support under FA9550-14-1-0146 awarded by The United States Air Force Office of Scientific Research. The government has certain rights in the invention.

FIELD

Fields of the invention include hydrogen and oxygen production. Another field of the invention is the plasma-induced dissociation of water and plasmachemical processing, in general. Another field of the invention is microplasma and microcavity plasma devices.

PRIORITY CLAIM AND REFERENCE TO RELATED APPLICATIONS

This application claims priority under 35 U.S.C. § 119 from prior U.S. provisional application No. 62/158,657, which was filed on May 8, 2015, and is incorporated by reference herein.

BACKGROUND

The potential of hydrogen as an environmentally-friendly fuel source has been studied extensively worldwide. As a fuel for vehicles, hydrogen is capable of dramatically reducing harmful emissions, as compared to the combustion of carbon-based fossil fuels. Hydrogen can also serve as the feedstock for fuel cells, or it can be burned in combustion engines in a manner comparable to that for gasoline in existing internal combustion engines. Furthermore, in contrast to gasoline or other hydrocarbon fuels, the primary byproduct of burning hydrogen in oxygen or air is water. Similarly, no air pollutants or greenhouse gases are produced when hydrogen is used in fuel cells.

Development of the so-called "hydrogen economy" has the potential to weaken or completely eliminate the current reliance on methane or gasoline. In 2008, Muradov and Veziroglu advocated the production of "carbon-neutral synthetic fuels from bio-carbon and hydrogen generated from water . . . ". Muradov, N. Z. and Veziroglu, T. N., "Green' Path from Fossil-Based to Hydrogen Economy: An Overview of Carbon-Neutral Technologies," International Journal of Hydrogen Energy, 33, 6804-6839 (2008).

The primary impediment to the development of such an economy is the introduction of efficient methods for producing hydrogen, and preferably doing so by point-of-use methods that do not require hydrocarbons as feedstocks to the process. At present, the most prevalent means for producing hydrogen are steam natural gas (methane) reforming and electrolysis. The former entails producing synthetic gas, a mixture of hydrogen, carbon monoxide, and carbon dioxide, by reacting natural gas with steam. Approximately 96% of the hydrogen generated worldwide is synthesized by this process (S. V. T. Nguyen, J. E. Foster, and A. D. Gallimore, Rev. Sci. Instrum., vol. 80, 083503 (2009)). Electrolysis is the process in which water is dissociated into oxygen and hydrogen by passing an electrical current through liquid water. Although electrolysis is capable of achieving efficiencies of 70-75%, this process requires high current densities, and the presence of considerable quantities of water in the reaction vessel. Therefore, the electrolysis of water generally requires the proximity of a substantial power source and, for this reason, several of the largest electrolysis sources of hydrogen are located near hydroelectric generating stations. Only 4% of the hydrogen produced worldwide is generated by electrolysis at present.

Much of the hydrogen produced in the United States is currently used for refining petroleum, treating metals, producing fertilizer, and processing foods. In order to make hydrogen more competitive as a fuel, the cost for its production must be reduced. Furthermore, the growing interest in transitioning the world's economies from a dependence on carbon-based fuels to renewable sources of energy suggests that a hydrogen production process that is not dependent on hydrocarbon feedstocks is desirable. As a result, researchers have been investigating the dissociation of water by several techniques. In one approach, high temperatures generated by solar concentrators or nuclear reactors drive chemical reactions that dissociate water to produce hydrogen. In another approach, microbes, such as green algae, consume water in the presence of sunlight, producing hydrogen as a byproduct. There are also photo-electrochemical systems that produce hydrogen from water using particular semiconductors and energy from sunlight.

Researchers have also investigated using plasmachemical reactions to dissociate water. Such processes have several advantages, as compared to the above-discussed methods, including the potential for product specificity by tailoring the characteristics of the plasma (electron temperature, electron density, etc.) and scalability in volume.

Jung et al. published a study of water dissociation in a microwave plasma (Jung et al., "Hydrogen Generation from the Dissociation of Water Using Microwave Plasmas," Chin. Phys. Letters, Vol. 30, No. 6 (2013). These experiments involved the dissociation of water vapor at pressures kept below 10-50 Torr, and the authors state that "it is difficult for water to be split (direct dissociation) by atmospheric pressure thermal plasma since the high electron collision rate . . . causes a very strong decrease in electron temperature." The electron densities were on the order of $10^{12}$ cm$^{-3}$ and the measured rate of hydrogen production was 1.8-2.7 grams of hydrogen per kWh of input electrical power to the reactor.

Nguyen et. al. have published results concerning water dissociation using an RF plasma generator. Nguyen et. al., "Operating a radio-frequency plasma source on water vapor," Review of Scientific Instruments 80, 083503 (2009). In this work, water vapor having a pressure of 300 mTorr was partially dissociated in an RF discharge driven at a frequency of 13.56 MHz. The reactor vessel was a quartz tube having a diameter of 15 cm and a length of 50 cm. The authors reported production of approximately 20 sccm of $H_2$ for 500 W of RF power.

Chen et al., "$H_2O$ splitting in tubular PACT (plasma and catalyst integrated technologies) reactors," J. Catal., vol. 201, no. 2, pp. 198-205, (July 2001) used tubular plasma and catalyst reactors with gold as a catalyst to dissociate water vapor carried by a stream of Ar. They achieved a dissociation degree of 14% and the highest energy efficiency realized was approximately 2%. In a study conducted by Suib et al., an energy efficiency of 1.1% was achieved without adopting a Pt catalyst. (S. L. Suib, Y. Hayashi, and H. Matsumoto, "Water splitting in low-temperature AC plasmas at atmospheric pressure," Res. Chem. Intermed., vol. 26, no. 9, pp. 849-874, (2000)). Kabashima et al. used a packed-bed plasma reactor to dissociate a stream of water vapor entrained in $N_2$. (H. Kabashima, et al., "Hydrogen generation from water with nonthermal plasma," *Chem. Lett.*, vol.

30, no. 12, pp. 1314-1315 (2001)). They were able to demonstrate 63% of water dissociation but at an energy efficiency of less than 1%.

SUMMARY OF THE INVENTION

A preferred embodiment of the invention is a method for dissociating water into hydrogen and oxygen. The preferred method includes introducing water vapor into a microchannel plasma array. Electrical power is applied to the microchannel plasma array to create a plasmachemical reaction of the water vapor in the microchannel plasma array. Hydrogen and/or oxygen gas produced by dissociation of water within the microplasmas is collected at an output of the microchannel plasma array. The water vapor can be entrained in a carrier gas, but is preferably introduced without carrier gas. Direct introduction of water vapor has been demonstrated to provide efficiencies at and above 60%. The use of carrier gas reduces efficiency, but still exceeds efficiencies of prior methods discussed in the background.

A preferred system for dissociating water vapor includes a microchannel plasma array having a plurality of microchannels. A water vapor supply injects water vapor at a predetermined pressure and flow rate into the plurality of microchannels. A power supply drives the microchannel plasma array to create a plasmachemical reaction of the water vapor in the microchannel plasma array. In preferred embodiments, the system includes a carrier supply and a bubbler for mixing gas from the carrier supply with the water vapor. Preferred systems can also include a plurality of micochannel plasma arrays.

Devices of the invention for heating water or for use in ovens include a system for dissociating water vapor having a microchannel plasma array comprising a plurality of microchannels. A hydrogen/oxygen burner ignites hydrogen and oxygen gas supplied by the array. A heat exchanger is heated by the burner. One preferred heating device is a water heater, where the heat exchanger heats water in a tank.

Preferred systems can be formed on a chip. Chips can be fabricated from aluminum strips and can be combined in parallel to increase the overall output of hydrogen and/or oxygen gas. A preferred system on a chip includes a water introduction port and a water absorber on the chip. A microchannel plasma array on the chip receives water vapor (steam) from the water absorber via an inlet. An outlet from the microchannel plasma array delivers the product gases, hydrogen and oxygen, to the following (downstream) stages of the system.

BRIEF DESCRIPTION OF THE DRAWINGS

FIG. 1A is a schematic diagram of a preferred embodiment microplasma-based dissociation system that includes additional features used experimentally for evaluating the microplasma-based dissociation of water into hydrogen and oxygen.

FIGS. 6A and 6B respectively show plan and side views of a preferred embodiment water vapor reactor chip;

DETAILED DESCRIPTION OF THE PREFERRED EMBODIMENTS

Figure 1B:
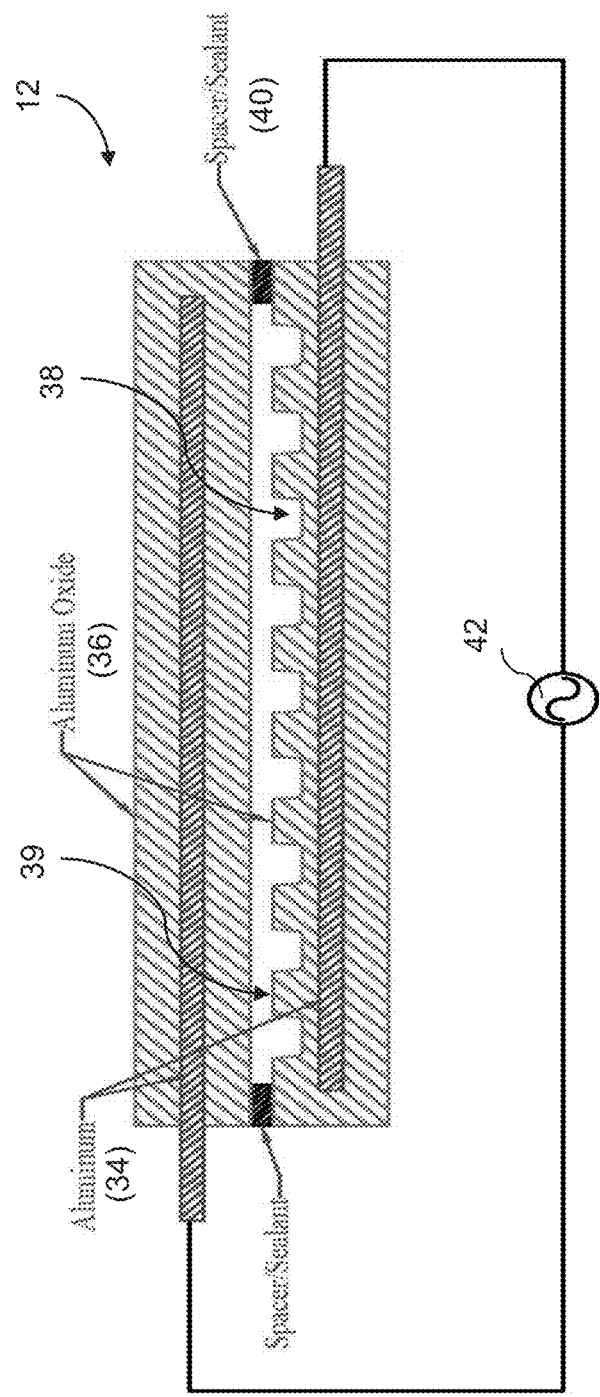
FIG. 1B is a cross-sectional diagram of a microplasma device used in the FIG. 1A system that includes an array of microchannel plasma devices.

The invention concerns methods and systems for dissociating water into hydrogen and oxygen via a plasmachemical reaction produced within microchannel plasma devices. The present inventors have provided new methods for efficient water dissociation for the production of both hydrogen and oxygen. The prevent invention now renders the dissociation of water an industrially attractive method for the production of hydrogen ($H_2$).

A preferred embodiment of the invention is a method for dissociating water into hydrogen and oxygen. Water vapor is introduced into microchannels in which glow discharges are produced at pressures up to, and above, one atmosphere. Because the electron density, electron temperature, and gas pressure can be considerably higher than values typical of macroscopic, electrically-produced plasmas, the efficiency of dissociating water is considerably higher than those available with previous technologies. For example, 20 sccm of hydrogen is produced for only 4 Watts of power input to a microchannel plasma reactor when water vapor is entrained in argon gas. Efficiencies (for the dissociation of water) above 60% have been obtained when water vapor alone is introduced to arrays of microchannel plasmas. Embodiments of the invention employ a water-resistant, thin dielectric film lining the microchannel walls, and other embodiments provide embedded water/steam trapping and recycling systems.

Compared to electrolysis production methods, the microplasma arrays used in the invention are voltage-controlled (not current-controlled) devices that require only low time-averaged currents. Since electrical design is much less demanding for voltage-controlled systems and component costs are considerably lower, the microplasma array generation of hydrogen (and oxygen) represents an environmentally-sound process that has the ability to compete economically with existing methods for generating hydrogen and oxygen, and applying this gas mixture to heating water in commercial and residential settings, for example.

Another advantage of microplasma device arrays used in preferred embodiments, relative to electrolysis, is that the microplasma process for producing hydrogen is readily scaled in throughput because of the chip architecture of the invention. That is, individual arrays comprising as many as several hundred microchannels are fabricated into a single "chip" and multiple chips can be stacked and held in modules so as to permit the distribution of water vapor among the chips and the collection of the desired product ($H_2$ and/or $O_2$) generated by all the chips. That is, the chip architecture allows for the hydrogen production process to be easily increased by simply installing more modules (and, thus, chips) into a system. Distributing the electrolysis process, on the other hand, is much more difficult and impractical because of the water reservoir and the high electrical currents required. Any process requiring high currents mandates that all electrical cables be kept short so as to minimize $I^2R$ losses.

Another feature of the invention is its ruggedness and, specifically, its ability to process water vapor in a plasma while maintaining a reactor lifetime of at least several thousand hours. Although the experiments noted earlier have reported the partial conversion of water vapor into hydrogen in macroscopic plasmas, water vapor is well-known in the plasma community to be responsible for the deterioration of the performance of plasma reactors. In plasma-based generators of ozone, for example, the inadvertent or intentional introduction of water vapor or room air into the gas feedstock is known to lead to a severe reduction in reactor lifetime and reactor performance. For the microchannel plasma reactors of the present invention, however, the structure of the thin films lining the microchannel wall can be chosen so as to isolate the microplasma electrodes both electrically and chemically from the plasma. Therefore, the microchannel walls can, for example, be covered with a thin film that is hydrophobic and yet has the proper electrical properties required of a dielectric.

Experiments have been conducted to demonstrate the invention. The experiments succeeded in efficiently producing hydrogen ($H_2$) and oxygen ($O_2$) from distilled water or ordinary tap water. In one group of experiments, an aluminum/alumina ($Al/Al_2O_3$) microchannel plasma reactor was used to generate $H_2$ with an energy efficiency of 2.5% by dissociating water vapor in Ar at atmospheric pressure and room temperature with the water vapor carried (entrained) in a carrier gas. This value of efficiency compares favorably with that for other plasma reactors reported in the literature, having reported energy efficiencies ≤2%. In the experiments, spectra of the $H_\alpha$ line are used to calculate electron densities, which are in the vicinity of $1.5\pm0.2\times10^{16}$ cm$^{-3}$, while spectra of the OH(A-X) transition show a distinctly non-equilibrium population distribution in the OH($A^2\Sigma^+$) state. The $Al/Al_2O_3$ microchannel plasma device was shown to be efficient in water dissociation, as compared with other plasma reactors recently reported in the literature. For example, 20 sccm of hydrogen is produced with a single array of microchannel plasmas to which 4 W of electrical power has been delivered. In order to produce the same amount of hydrogen (20 sccm), several previous reactors have required as much as, or more than, 500 W of electrical power.

Experiments have shown that water vapor can be dissociated into hydrogen and oxygen with an energy efficiency of more than 60% in an array of microchannel plasmas. In these experiments, the water vapor was injected directly into the microplasma reactor without the aid of a carrier gas and the total water vapor pressure was low (typically less than 20 Torr). Increasing the pressure at which water vapor is injected into a microchannel plasma reactor may lower the efficiency for the process, but the efficiencies already obtained at reduced pressure suggest that efficiencies well beyond those obtained previously with macroscopic plasma reactors will be realized at atmospheric pressure. In fact, efficiencies lower than those already demonstrated with embodiments of the invention would still provide great potential for point-of-use hydrogen/oxygen generation from water, which could readily become an economical, carbon-free energy source for commercial and residential heating devices such as water heaters, cook top stoves, furnaces, and commercial ovens. Such systems would bypass the cost associated with the remote production and transportation of carbon-based fuels such as natural gas. It must be emphasized that this scenario is feasible only because microplasma systems can be made sufficiently compact, inexpensive, and efficient that each residential and commercial heater or oven would have its own dedicated hydrogen production unit. Because generation can be distributed (i.e., is a point-of-use production method), costs are reduced. The environmental and economic potential of such a technology to the U.S. are enormous. It is also important to note that the heating value (HHV) for hydrogen is more than three times higher than that for natural gas. Therefore, the production costs for hydrogen can be greater than those for natural gas and yet hydrogen will remain less expensive overall when the heat released by burning these fuels is considered.

While preferred embodiments and experiments to be discussed herein used aluminum/alumina ($Al/Al_2O_3$) microchannel plasma array reactors, other materials may be employed in microchannel plasma reactors, such as the titanium/titanium dioxide materials system. Professor J. Gary Eden and colleagues at the University of Illinois have obtained patents on microchannel plasma devices in other materials, e.g. in polymers or glass. Exemplary systems that can be used are disclosed in the following patents, which are incorporated by reference herein. U.S. Pat. No. 8,968,668, entitled Arrays of metal and metal oxide microplasma devices with defect free oxide; U.S. Pat. No. 8,890,409, entitled Microcavity and microchannel plasma device arrays in a single, unitary sheet; U.S. Pat. No. 8,890,409, entitled Microcavity and microchannel plasma device arrays in a single, unitary sheet; U.S. Pat. No. 8,870,618, entitled, Encapsulated metal microtip microplasma device and array fabrication methods; U.S. Pat. No. 8,864,542, entitled Polymer microcavity and microchannel device and array fabrication method; U.S. Pat. No. 8,547,004, entitled Encapsulated metal microtip microplasma devices, arrays and fabrication methods; U.S. Pat. No. 8,497,631, entitled Polymer microcavity and microchannel devices and fabrication method; U.S. Pat. No. 8,492,744, entitled Semiconducting microcavity and microchannel plasma devices; U.S. Pat. No. 8,442,091, entitled Microchannel laser having microplasma gain media; U.S. Pat. No. 7,573,202, entitled Metal/dielectric multilayer microdischarge devices and arrays; U.S. Pat. No. 7,482,750, entitled Plasma extraction microcavity plasma device and method; and U.S. Pat. No. 6,194,833, entitled Microdischarge lamp and array While preferred embodiments have been demonstrated with metal and metal oxide microchannel arrays of a particular size, other suitable microchannel arrays can be formed in the materials and sizes in any of the above patents.

Particular examples include linear arrays of 25-200 μm wide channels which have been fabricated in glass by replica molding and micropowder blasting, and have been demonstrated to be capable of generating low temperature, non-equilibrium microplasmas. See, Sung, Hwang, Park and Eden, "Interchannel optical coupling within arrays of linear microplasmas generated in 25-200 μm wide glass channels," Appl. Phys. Lett. 97, 231502 (2010). Parallel microchannels have also been fabricated in nanostructured alumina ($Al_2O_3$) via a nanopowder blasting process, and shown to provide the capability for routing, and controlling the flow of, packets of low temperature, nonequilibrium plasma. See, Cho, Park and Eden, "Propagation and decay of low temperature plasma packets in arrays of dielectric microchannels," Appl. Phys. Lett. 101, 253508 (2012). Further development and research on these and additional microchannel structures by some of the present inventors and colleagues produced ozone microreactors capable of generating ozone and dissociating (fragmenting) molecules in the gas or vapor phase. See, [0062]-[0066] of commonly owned Eden et al., US Published Patent Application 2013/0071297, published Mar. 21, 2013. The ozone microreactor in the '297 application included 12 microchannels that supported a flow rate of 0.5 standard liters per minute and ozone generation efficiencies exceeding 150 g/kWh. One of the distinctions between the ozone reactors mentioned above and the present invention is the changes in the engineering design of the chip microplasma reactor that are made to accommodate water vapor. Such changes will be discussed with respect to an example embodiment of a reactor chip of the invention that will be discussed in connection with FIGS. 6A and 6B.

Microchannel plasma arrays can vary in dimensions as well as material. Arrays fabricated in metal and metal oxide in previous experiments have channels that are typically 100-500 microns in width and 2-5 cm in length. However, channel widths below 5 microns and channel lengths of at least tens of cm can readily be fabricated. Also, arrays comprising hundreds to thousands of microchannel plasma devices, in a single array, can be produced. In the polymer microchannel arrays disclosed in U.S. Pat. No. 8,864,542, high aspect ratio microchannels are provided that can be formed into patterns having a wide variety of shapes, e.g., straight, zig-zag and other shapes. Very long, high aspect ratio channels can be formed, e.g., a one meter channel that is 20 microns wide. In addition, the number of microchannels can be quite high (in the thousands) and provided over large surface areas (tens to thousands of square centimeters and larger) on either rigid or flexible substrates.

Preferred embodiments of the invention will now be discussed with respect to the drawings and with respect to experiments that have demonstrated preferred embodiments of the invention. The drawings may include schematic representations, which will be understood by artisans in view of the general knowledge in the art and the description that follows. Features may be exaggerated in the drawings for emphasis, and features may not be to scale. Artisans will appreciate broader aspects of the invention from the following discussion of experiments and specific embodiments.

FIG. 1A illustrates an exemplary microplasma dissociation system 10, which includes features used experimentally to test the system. FIG. 1B illustrates a microchannel plasma array or chip 12 used in the FIG. 1A system. The FIG. 1A system 10 was used in experiments.

The microchannel plasma array or chip 12 used in most of the experiments conducted to date consisted of 12 microchannels, 300 μm in width and 2 cm in length, which were fabricated in the $Al/Al_2O_3$ materials system as described in U.S. Pat. No. 8,968,668. Another exemplary metal/metal oxide material system is titanium and titanium dioxide ($Ti/TiO_2$). Other metal/metal oxide material systems will be apparent to artisans, as will other materials, dimensions and number of channels, with reference to the above description of microchannel devices.

A plurality of gas sources 14 were included to allow experiments that involved entraining water vapor in a rare gas (such as He, Ne, or Ar). The gases flowed through a mass flow controller (MFC) 16 to a premix 18 that allowed for the gas flow pressure to be precisely controlled. An injection pump 22 draws water from a reservoir 24 via through a filter. A pressure 26 meter and backpressure valve 28 serve to regulate the flow rate and pressure of the water vapor. When carrier gases were used, the gases were mixed with water vapor by a bubbler and flowed through the microplasma array or chip 12. In the experiments, the chip was powered by a 20 kHz, 3 kV (RMS) sinusoidal driving voltage. A different driving voltage in the form of a series of fast risetime pulses is expected to produce higher efficiencies but has not been investigated to date. A residual gas analyzer (RGA) and vent 30 serve to measure gas product composition from the array. FIG. 1B illustrates a cross-sectional diagram of one embodiment of the chip microchannel plasma reactor 12, which includes aluminum electrodes 34 buried in aluminum oxide 36 layers, one of which forms microchannels 38. The layers 36 are joined and sealed by sealant 40 and the electrodes 34 are powered by a power source 42. In FIG. 1B, nanoporous alumina is shown as the dielectric for a dielectric barrier discharge (DBD) design for the chip but other dielectric and array geometries also perform well. FIG. 1B also shows an additional film or films 39, deposited onto the walls of the microchannels 38, which is desirable in order to inhibit the absorption of residual water vapor. These dielectric layer(s) 39 can be a single material or a hybrid (composite) material which is hydrophobic so that wetting of the electrode surface with water vapor during operation of the device is prevented. For example, thin films of lanthanide oxide materials have the requisite properties. To promote adhesion of the hydrophobic film(s) with existing $Al_2O_3$ dielectrics, an adhesive layer which is prepared as a mixture of ceramics (such as Aluminum Oxide, Silica, Zirconium Oxide or Silicon Carbide) and organic binder to match the thermal expansion between each dielectric film or between a composite dielectric and the electrical oxide can be utilized.

Figure 2:
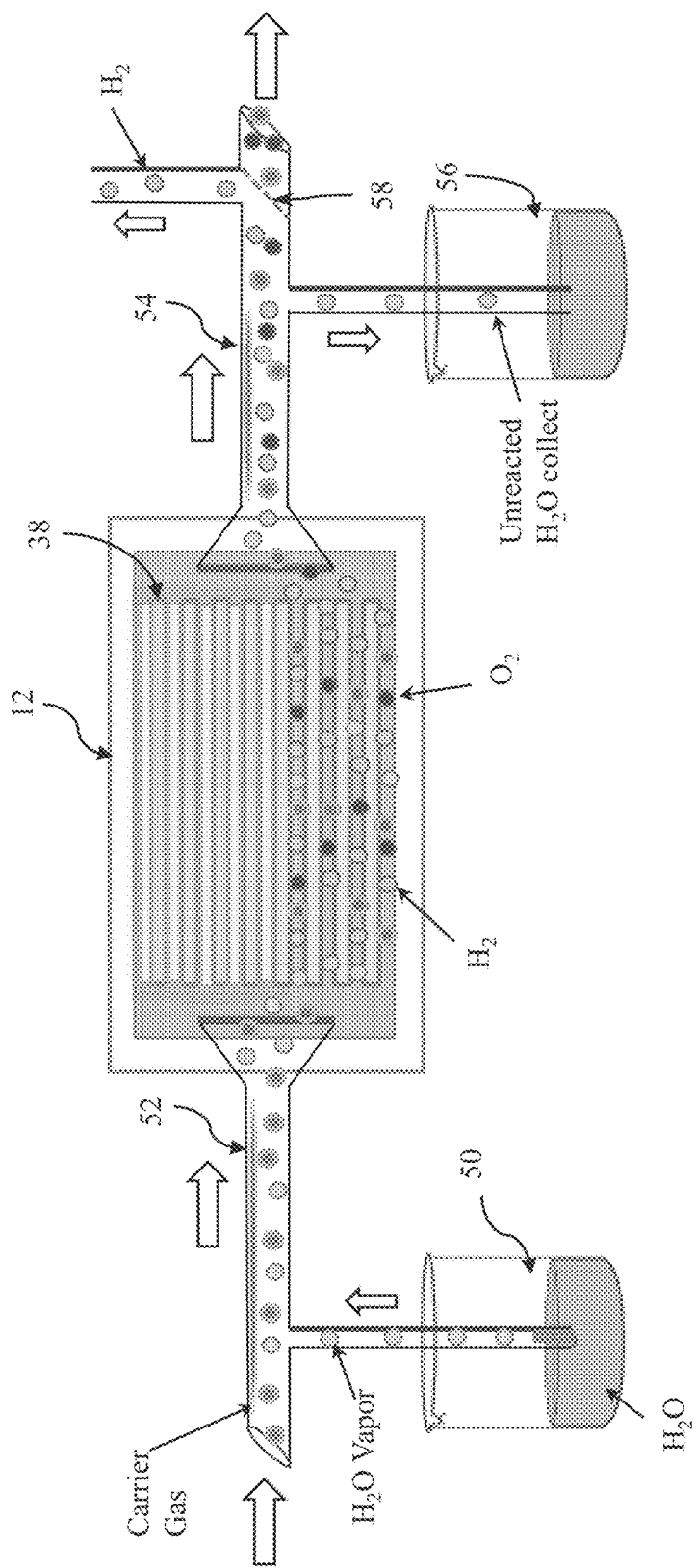
FIG. 2 is a schematic diagram illustrating introduction of water vapor and carrier gas into an array of microchannel plasma devices, followed by the extraction and separation of oxygen, hydrogen and unreacted water.

FIG. 2 is a schematic diagram of a preferred embodiment hydrogen/oxygen production system based on microchannel plasma reactors. This embodiment incorporates elements necessary for an industrially viable system is, therefore, distinct from the experimental evaluation/testing system shown in FIG. 1A. FIG. 2 illustrates the introduction of water vapor and an optional carrier gas into an array of microchannel plasma devices 12, followed by the extraction and separation of oxygen, hydrogen and unreacted water. Water vapor, generated from a water source 50, can be entrained in a carrier gas such as steam or a rare gas and is introduced via an inlet 52 to a microchannel plasma array 12 that includes multiple channels 38, which might be straight and parallel as shown, or have completely different geometries (for example, with micro-reservoirs microfabricated into the sidewall of the channels). Plasma generated in the water vapor within the microchannels produces hydrogen and oxygen by processes such as electron impact dissociation of the water molecule, followed by electron impact dissociation of the hydroxyl radical (OH), three body (teratomic) recombination of two hydrogen atoms with a third body, and other plasmachemical reaction mechanisms. The hydrogen and oxygen exit the reactor via an outlet 54. Unreacted water vapor is collected in a reservoir 56 and recycled (re-introduced to the input of the reactor chip. Hydrogen product can be separated from oxygen via a conventional hydrogen separator 58, if desired. Example hydrogen separators include hydrogen separation membranes. For a number of applications of this invention, including those involving the generation of a flame (e.g., water heaters, furnaces, ovens), maintaining the mixture of oxygen and hydrogen produced by the reactor is advantageous and, in these instances, the hydrogen separator 58 can be omitted.

Figure 3A:
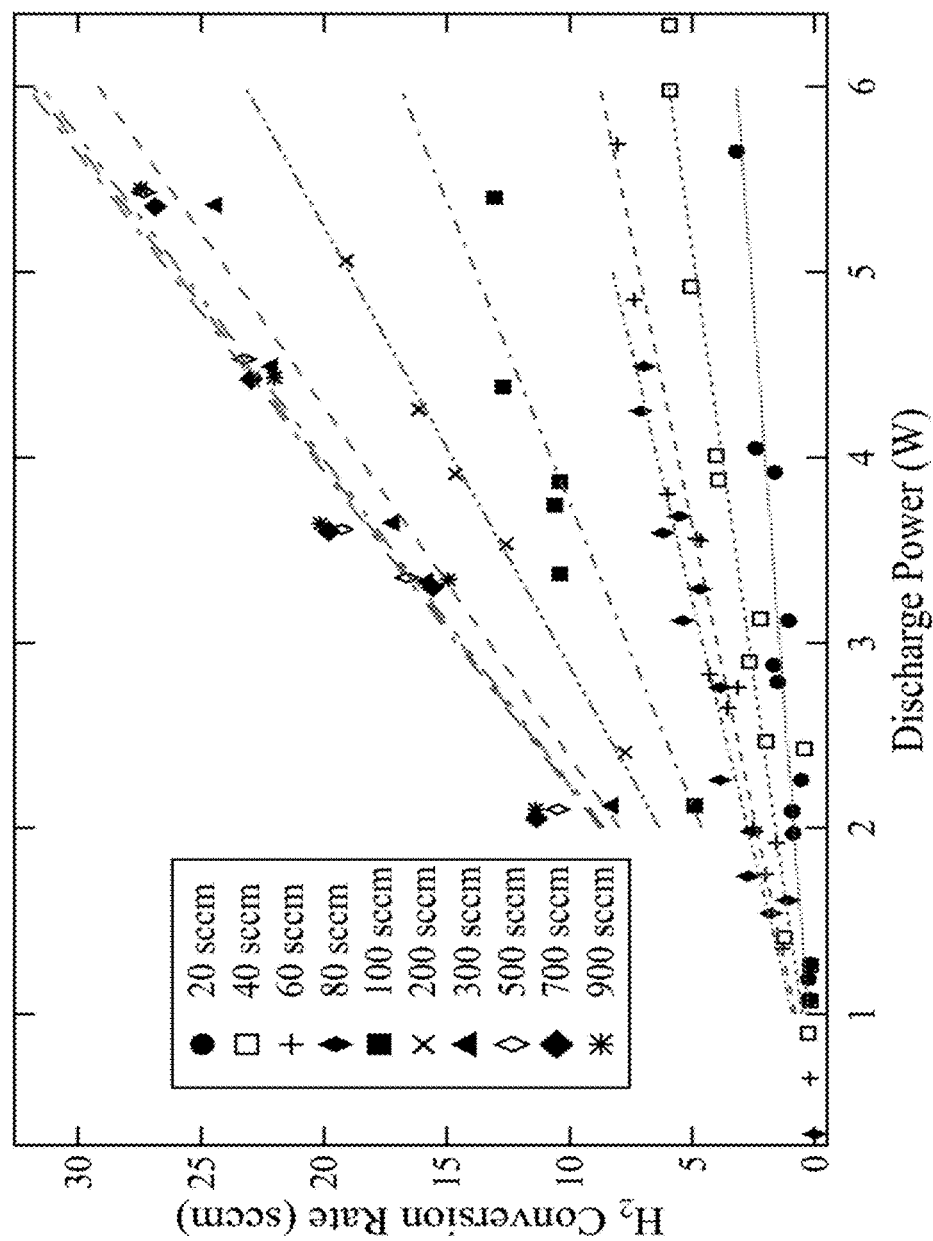
FIG. 3A is experimental data indicating the dependence of the hydrogen conversion rate (expressed in sccm) on the power delivered to a 12 microchannel plasma array; the data of FIG. 3A were obtained with water vapor entrained in an argon gas flow, and results are shown for 10 values of the Ar flow rate.

With reference again to FIG. 1A, plasma produced within the microchannels 38 dissociates a portion of the water vapor molecules present in the microchannels 38, and the composition of the gas mixture emerging from the channel array ("effluent") is measured by the residual gas analyzer (RGA) 30. FIG. 3A shows data obtained when water vapor at room temperature is entrained in Ar at various mass flow rates. Maximum $H_2$ production rates of almost 28 sccm are observed when the average power delivered to the microplasma array is 5.3 W. This corresponds to an energy conversion efficiency of approximately 2.5% which, although not terribly impressive, is higher than values reported previously for the dissociation of water with macroscopic plasmas of prior art discussed in the background section. For example, Nguyen et al. (mentioned earlier) reported the production of 20 sccm of hydrogen for a power input to the system of 500 W. Consequently, the efficiency for the production of hydrogen with the present invention is approximately two orders of magnitude higher than that obtained in a number of previous studies involving macroscopic plasma sources. As will be discussed later, still higher efficiencies are obtained with the present invention when one discards the carrier rare gas.

Figure 3B:
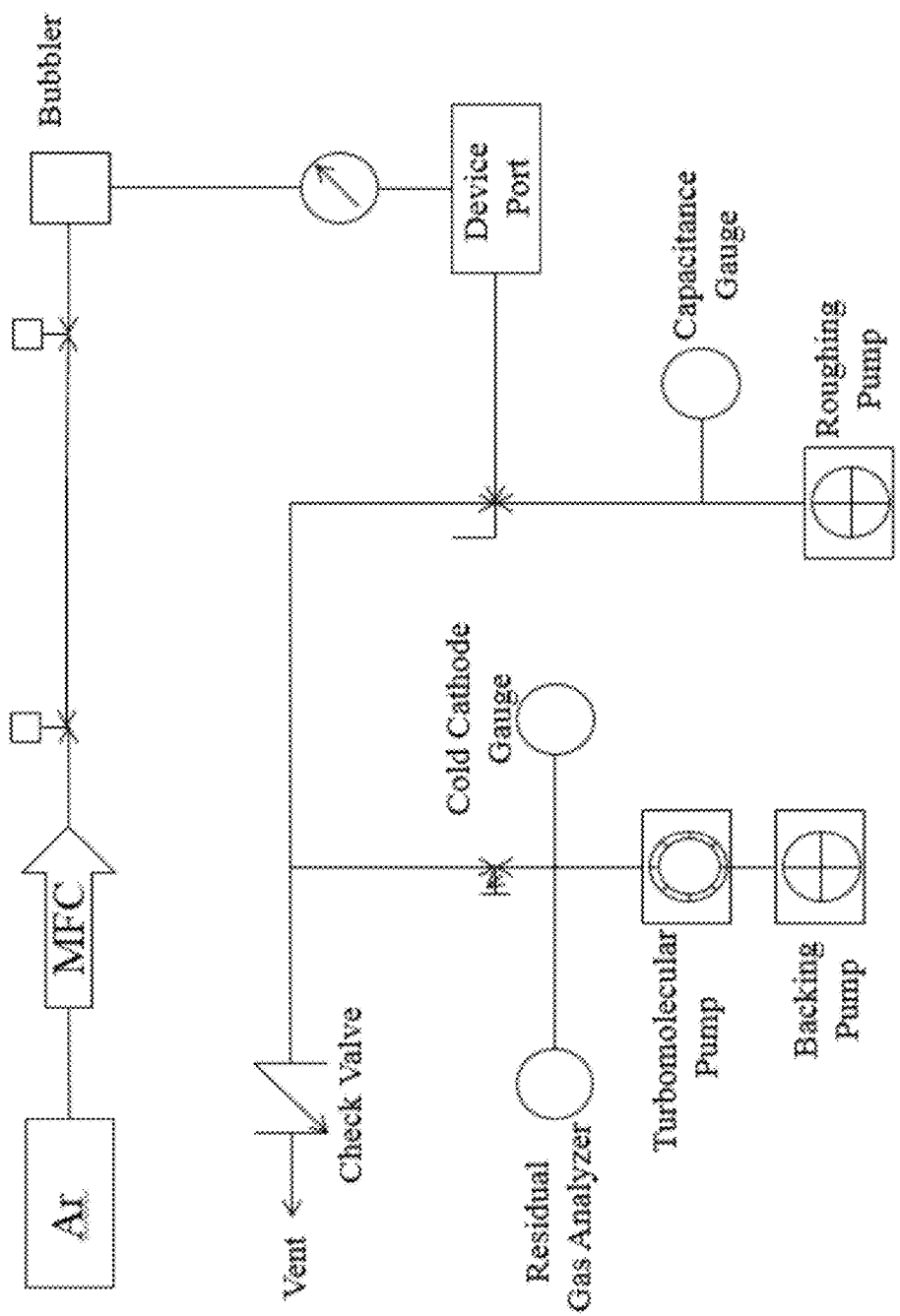
FIG. 3B shows the testing arrangement used to obtain the data of FIG. 3A.

The data of FIG. 3A were obtained with a microchannel array fabricated in a manner similar to that described by M. H. Kim, J. H. Cho, S. B. Ban, R. Y. Choi, E. J. Kwon, S.-J. Park, and J. G. Eden, "Efficient generation of ozone in arrays of microchannel plasmas," J. Phys. D. Appl. Phys., vol. 46, no. 30, p. 305201, July 2013, except that the Al/$Al_2O_3$ substrate was fabricated by a single anodization step. The fabrication process is briefly summarized as follows. A piece of 500 μm thick aluminum foil was anodized in a 0.3 M oxalic acid solution for 48 hours at 100 V and room temperature. The result of this was the growth of a layer of nanoporous alumina on the native aluminum, resulting in the entire substrate having a thickness of about 680 μm. A second aluminum sheet with an initial thickness of 125 μm was anodized for 4 hours under the same conditions and used as the top electrode. The alumina layer produced this way was approximately 40 μm thick. A polydimethylsiloxane (PDMS) stamp was used as a photolithographic mask to define the geometry of the microchannels. It was molded from a silicon master stamp fabricated by conventional photolithographic processes. The PDMS stamp was pressed into a UV-curable polymer applied on top of the alumina layer, which was subsequently cured to expose only the channel areas. The channels were then etched with a micropowder blaster for which the speed (of the microblaster nozzle relative to the working piece), working distance to the substrate, nozzle geometry, backing pressure, and number of "passes" of the micropowder jet over the substrate were controlled by a computer. The resulting geometry was an array of 12 channels, each of which is 250 μm in width, 150 μm in depth, and 3 cm in length. The period (center-to-center spacing between the channels) for the array is 500 μm and the cross-sectional geometry (shape) of the channels can be controlled by the above parameters for the microblasting process. Furthermore, the microchannels may be fabricated by other processes such as laser ablation and chemical etching, both of which are able to precisely control the microchannel geometry. Following the etching steps, the top electrode and bottom channel layer were hermetically sealed. Two glass tubes serving as the gas inlet and outlet were also hermetically attached to the ends of the channels. Water vapor was introduced into the device through a bubbler using ultra-high purity Ar as the carrier gas at room temperature and atmospheric pressure. The resulting feed gas contained 2.3 mol % of water vapor according to the equilibrium vapor pressure of water. A schematic of the gas flow and testing system is shown in FIG. 3B. The Ar gas flow was controlled by a calibrated Brooks UFC-1660 mass flow controller (MFC) with ±10 sccm accuracy. The device was driven by a 20 kHz sinusoidal wave at controllable voltages to generate plasmas in each of the microchannels. The effluent gas composition was analyzed in-line by an Inficon Transpector 2.0 residual gas analyzer (RGA). To obtain quantitative $H_2$ concentration information, the RGA was calibrated with known flow rates of Ar and $H_2$ gases to obtain a calibration factor relating the current signal response for $H_2$ to that for Ar, as measured by the RGA. During the actual calculation, the mole percentage of Ar in the effluent was assumed to be constant because its molar concentration change was <0.2%. The emission spectrum of the plasma was recorded by a Princeton Instruments PIMAX 4 gated, intensified charge-coupled device (ICCD) camera coupled with an Acton SP2570 0.75 m Czerny-Turner spectrometer. The spectral resolution of this system was calibrated with known atomic lines at various wavelengths. For devices that were used to collect the spectra, a sapphire window was embedded in the gas inlet tube so that the deep ultraviolet (UV) portion of the spectra could be transmitted. The absolute yield of hydrogen gas ($Y_H$) was calculated based on equation $$Y_H = \frac{S_H}{C \times S_{Ar}} \times Q_{Ar}$$

where $S_H$ and $S_{Ar}$ are the current signal strengths detected by the RGA from the peaks with masses 2 and 40, corresponding to $H_2$ and Ar. C is the calibration factor and $Q_{Ar}$ is the flow rate of Ar. The energy efficiency of water dissociation (η) was calculated with the equation (2):

$$\eta = Y_H \times \frac{H_{H_2O}}{P}$$

where $H_{H_2O}$ is the higher heating value of water (142.18 MJ/kg), and P is the discharge power.

The absolute rate of $H_2$ production, as a function of the input power for Ar flow rates ranging from 20 sccm to 900 sccm, is shown in FIG. 3A. The maximum $H_2$ production rate achieved in this experiment was ~28 sccm, recorded at the maximum flow rate and discharge power available. For all flow rates, there existed an input power level below which no hydrogen was generated. In this particular system, this power was found to be ~0.5 W through linear extrapolation. In a water vapor plasma, such a dissociation threshold indicated the existence of an activation barrier to the formation of $H_2$ gas. In addition, the $H_2$ production rate rose linearly with the discharge power for a constant Ar flow rate. This increase was likely due to a higher density of the reactive intermediate species as indicated by the increased intensity in the optical emission spectra. The effect of electrical power input on the $H_2$ production rate, as measured by the slope of the linear fits to the data shown in FIG. 3A, differed for various Ar flow rates. The specific testing and measurement arrangement is shown in FIG. 3B. Since the flow rate was observed to have little effect on the threshold dissociation power, an increase in the slope indicated a higher energy efficiency for $H_2$ production. The relationship between this production efficiency and the Ar flow rate is plotted in FIG. 3C. FIG. 3D is a plot of the energy efficiency for the dissociation of water vapor, measured as a function of the discharge power for multiple flow rates in the 20-100 sccm interval.

Figure 3C:
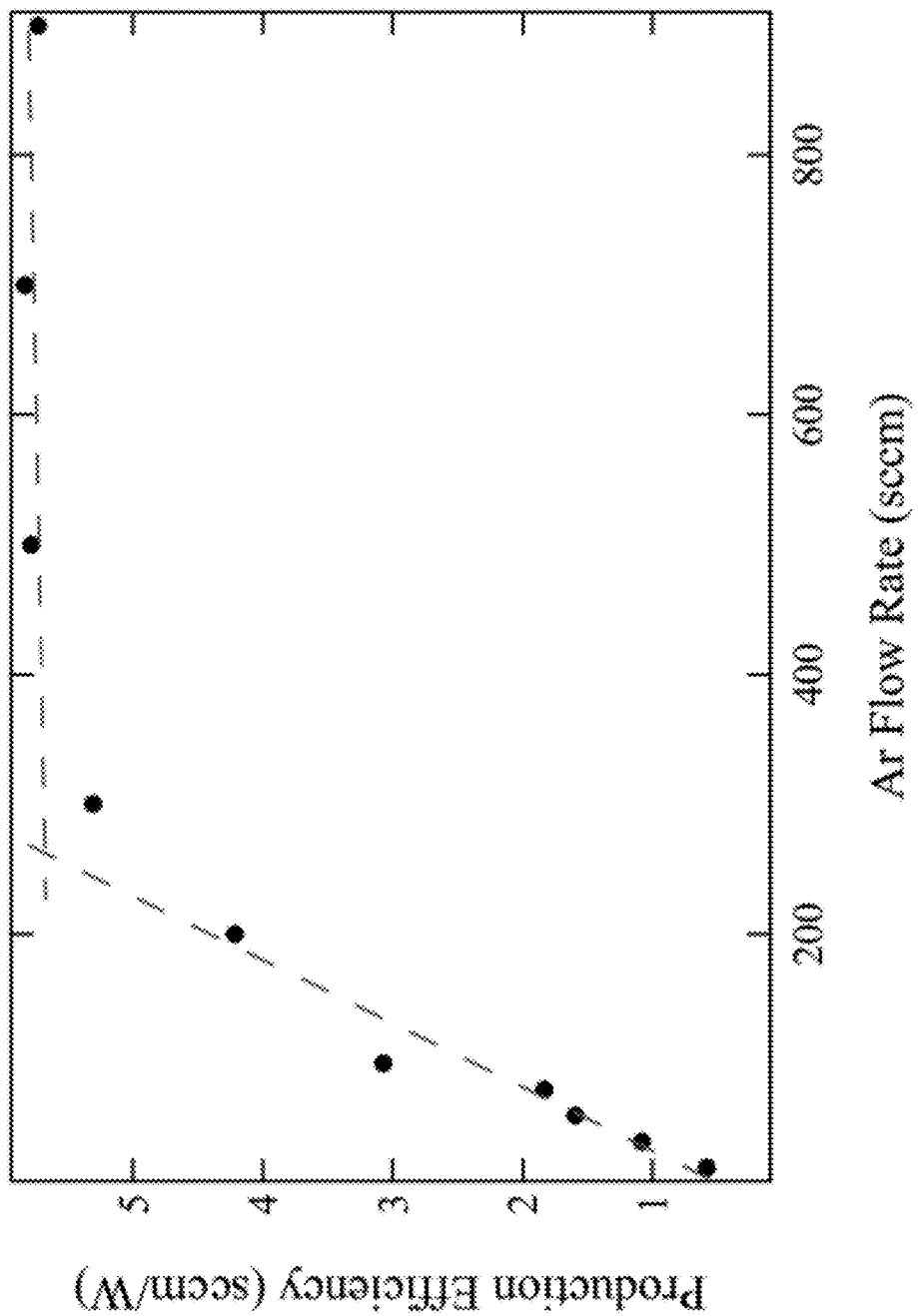
FIG. 3C is the $H_2$ production efficiency as taken from the slope of the data in FIG. 3A at various Ar flow rates; the production efficiency at low flow rates showed a linear increase with flow rate, but saturated at flow rates above ~400 sccm.
Figure 3D:
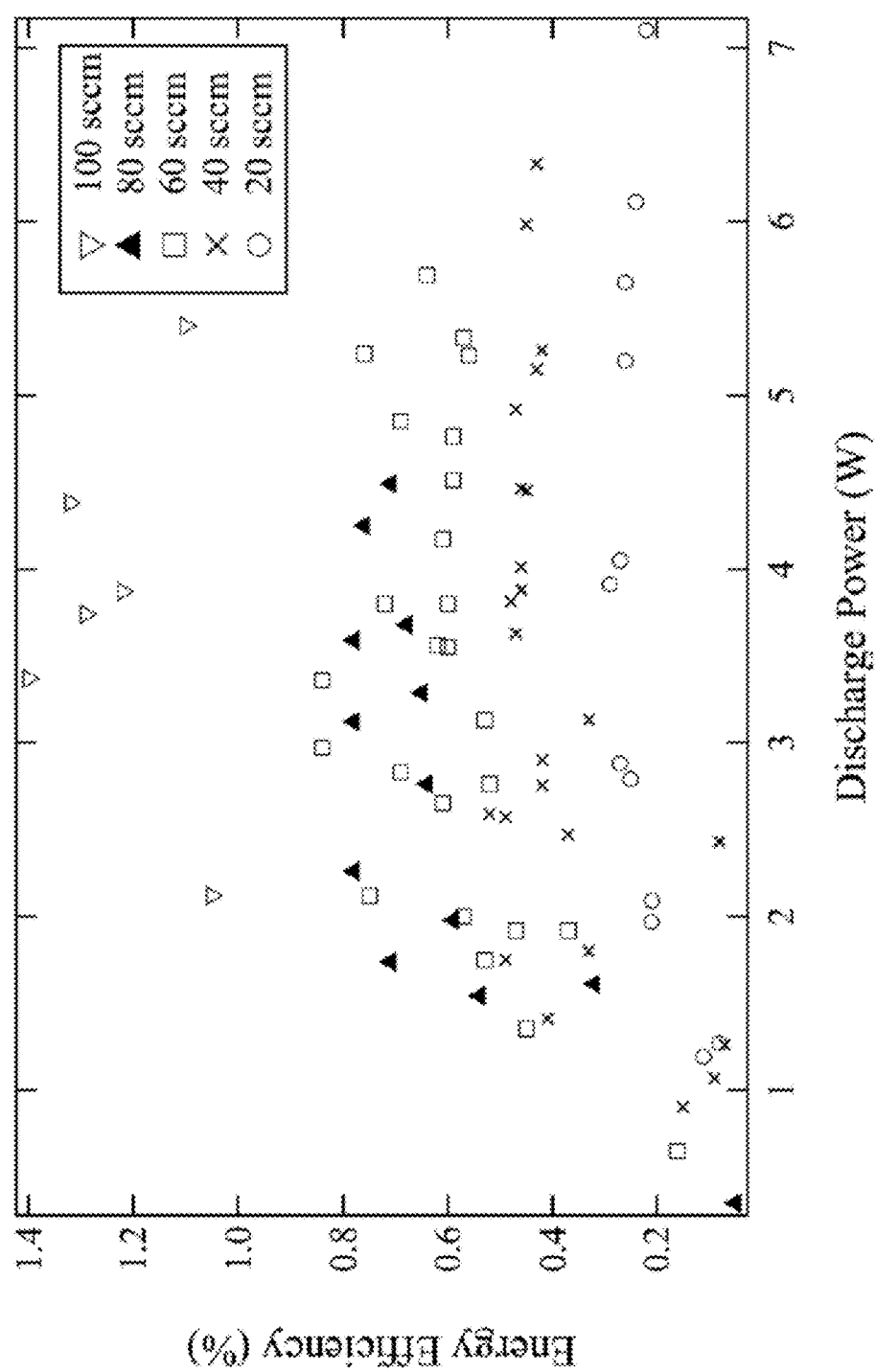
FIG. 3D is a plot of the energy efficiency for the dissociation of water vapor, measured as a function of the discharge power for multiple flow rates in the 20-100 sccm range.

As seen in FIG. 3C, at low Ar flow rates (up to 300 sccm), the hydrogen production efficiency rose nearly linearly with the flow rate. Beyond that level, the efficiency continued to increase, but with a decreasing rate, eventually leveling at about 5.8 sccm/W for the reactor chip structure described earlier. As the entrained water vapor concentration was constant for all Ar flow rates, the degree of dissociation of the water then decreased throughout this region with no rise in absolute $H_2$ production, indicating the existence of an optimal flow rate for the system. There are several reasons that might account for this saturation. In terms of chemical equilibrium, the reverse recombination reaction (i.e., to reform water) is in competition with the forward dissociation reaction. As the flow increases from a small value, even though the absolute $H_2$ production rate increases, the dissociation degree decreases, which favors the forward reaction and, therefore, increases the production efficiency. However, at high flow rates, the residence time of the gaseous species (water molecules) in the plasma region becomes short, reaching ~0.5 ms at 900 sccm. This value is comparable to the lifetime of some stable reaction intermediates such as OH (the hydroxyl radical), which participates in the overall reaction through neutral-neutral interactions, charge transfer, and the dissociative attachment processes. In addition, previous kinetic studies of water vapor plasmolysis at atmospheric pressure showed that the reaction time scale for reaching equilibrium was on the order of a few milliseconds. See, F. Rehman, J. H. Lozano-Parada, and W. B. Zimmerman, "A kinetic model for $H_2$ production by plasmolysis of water vapours at atmospheric pressure in a dielectric barrier discharge microchannel reactor," *Int. J. Hydrogen Energy*, vol. 37, no. 23, pp. 17678-17690, December 2012. It is, therefore, highly likely that the short residence time of a molecule at flow rates on the order of 1 slm (an above) is preventing the reaction from reaching equilibrium and, thus, lowers the rate and degree of molecular dissociation. The test results and additional information known to the inventors indicated preferred ranges of the flow rate of the water vapor entrained in gas of ~100 sccm and ~900 sccm at a pressure between 10 Torr and 10 bar, and applying electrical power of between ~1-100 W of power per microchannel plasma chip.

Another important metric in measuring the effectiveness of $H_2$ production is energy efficiency, which is plotted in FIG. 3D as a function of discharge power for various flow rates. At all of the tested flow rates, the energy efficiency initially increased with the discharge power at low power levels. However, above ~4 W/12 channel chip, the energy efficiency reached a maximum level and slowly decreased at higher discharge powers, indicating the existence of an optimal power loading. The maximal power efficiency obtained in these experiments was about 2.5% with an Ar flow rate of 900 sccm. In addition, the system impedance increased at high discharge power due to an increase in the reactor temperature, resulting in a decrease in the energy efficiency.

Figure 4:
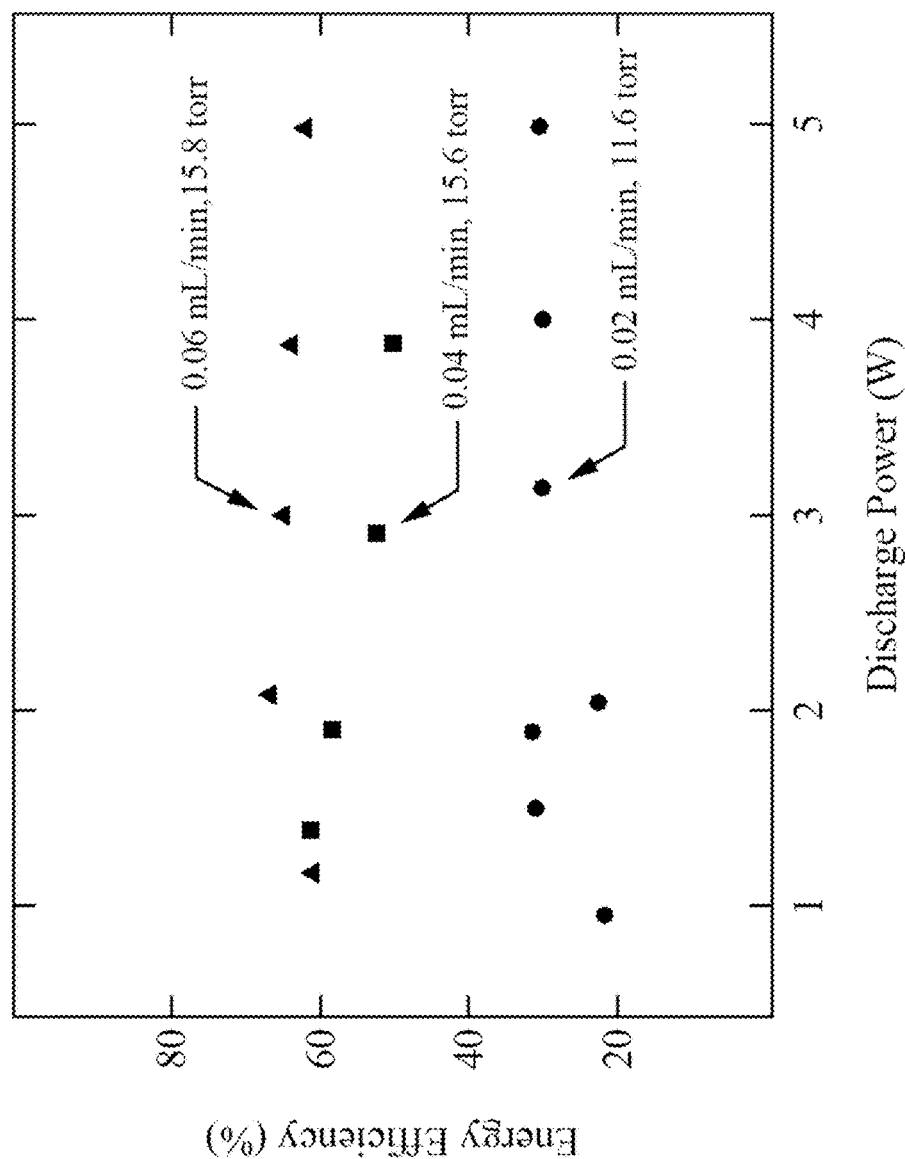
FIG. 4 is experimental data for the conversion of water into hydrogen when water vapor alone (without carrier gas) is injected into a single microchannel plasma array comprising 12 microchannels, demonstrating much higher efficiencies (up to approximately 70%) than those obtained with carrier gas (FIG. 3D)

Much greater efficiencies have been demonstrated in additional experiments by omitting the carrier gas. In these follow-on experiments, water vapor was injected directly into the plasma microchannels without additional carrier gas, and energy efficiencies approaching ~70% have been obtained. FIG. 4 includes representative data for a single microplasma chip comprising 12 microchannels. Data are given for several different values of the water vapor pressure, and the data show that efficiencies between 60% and 70% are realized routinely. While not necessary to demonstrate the invention, such efficiencies are believed to represent a breakthrough in conversion efficiency, since no prior plasma dissociation system in the past (known to the inventors) has come within an order of magnitude of these values. Preferred methods and systems of the invention that utilize direct injection of water vapor (i.e., without carrier gas), combined with advances in the design of the microchannel reactor chip, provide a breakthrough advance for plasma processing and hydrogen/oxygen production, in particular.

Figure 5:
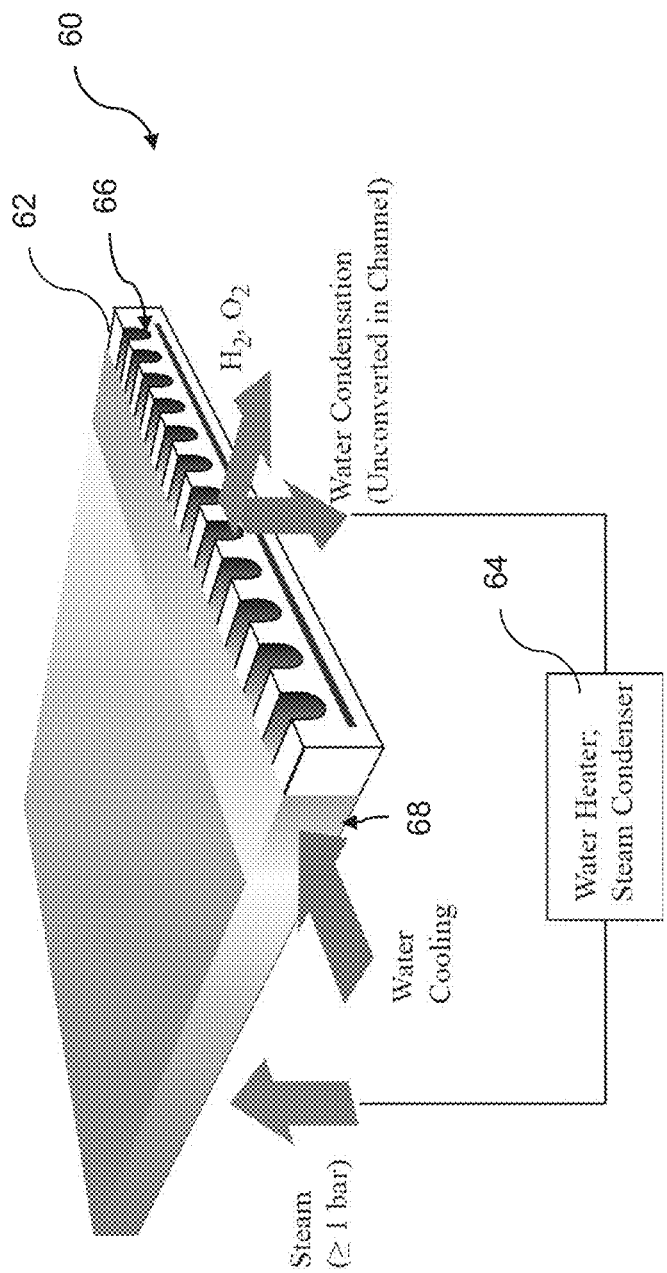
FIG. 5 is a schematic perspective diagram of a preferred system for dissociating water that includes steam injection into a microchannel device array and cooling to collect and recirculate unreacted water.

FIG. 5 illustrates another preferred embodiment system 60 for water dissociation in a microchannel plasma array or chip 62. In the FIG. 5 embodiment, steam is generated by a water heater and steam condenser 64. The steam is injected into the microchannel plasma array or chip 62. Unreacted water vapor is collected near the terminus (exit) 66 of the microchannels by water cooling 68, external to the channels but near their terminus 66, thereby ensuring that water serves several functions in this system. The unreacted water vapor is then recycled into the steam generator and condenser 64. Hydrogen and/or oxygen is collected at the microchannel array terminus 66 by condensation and/or separation, as illustrated in FIG. 2 and discussed in connection with FIGS. 6A and 6B below. An alternative is to have the channel array terminate at a cooled block. In this way, water vapor not converted into $H_2$ and $O_2$ is collected and then re-injected into the channels of the same (or another) chip.

The throughput of systems of FIGS. 1 and 5 can be readily multiplied for expanded processing. As the microplasma arrays are in the form of chips, additional chips can be stacked or otherwise arranged so as to increase processing capacity. A modular approach is provided in Eden et al. US Published Patent Application no 2015/0270110, application Ser. No. 14/495,306, U.S. patent Ser. No. 9,390,894, which is incorporated by reference herein. That application discloses modular microchannel microplasma reactors, reactor modules and modular reactor systems that include pluralities of the modular microchannel reactors and reactor modules. The reactors, reactor modules and modular systems are readily combined and scaled into large systems. This application disclosed the use of microplasma reactors for the processing of gas, but these reactors can be incorporated into the systems of FIG. 1 or 5 and fed with water vapor in accordance with the present invention.

FIGS. 6A and 6B show an individual microchannel plasma reactor chip 70 that has been modified in the present application so as to dissociate water vapor in the systems of FIG. 1, FIG. 2, or FIG. 4. FIGS. 6A and 6B are, respectively, plan and side view schematic illustrations of the microchannel plasma reactor chip 70 that has been designed to produce hydrogen from water vapor with maximum efficiency. Multiple chips can be used in parallel to increase capacity, as will be appreciated by artisans. In plan view (FIG. 6A), a port 72 for the introduction of water vapor to the reactor can be formed as a rectangular slot in the chip 70 and can include a membrane filter 73. After entering the chip 70, excess water is removed from the steam feedstock by a thermally resistant, porous water absorber 74. The absorber 74 can be in the form of a stack of multiple thin films of water absorbing materials or porous particles that are compacted into a thin wafer. This section is responsible for minimizing water condensation within the microchannels of a microchannel plasma array 76 and providing consistent (time-invariant) injection of water vapor feedstock during operation. As added protection to the oxide dielectric separating the electrodes from the plasma in the channels, one or more additional dielectric films is preferably deposited onto the nanoporous aluminum oxide that forms the microchannel walls. At the exit of the microchannel array 76 is a combination gas adsorber/separator 78 which serves to remove unreacted water vapor from the effluent from the reactor. Thus, the hydrogen/oxygen product is separated from the water vapor and the latter is re-cycled. The gas absorber/separator can take on several forms, one of which is a form of a molecular sieve filter that selectively removes hydrogen from other gases and vapors in the reactor effluent stream. Because of the different retention times for the desired product ($H_2$ and/or oxygen), relative to that for other gases, at this separation medium, the time-differential injection (through a pulse valve, for example) of feedstock gases or vapors into the microchannel plasma chip can increase the efficiency of product collection.

Figure 7:
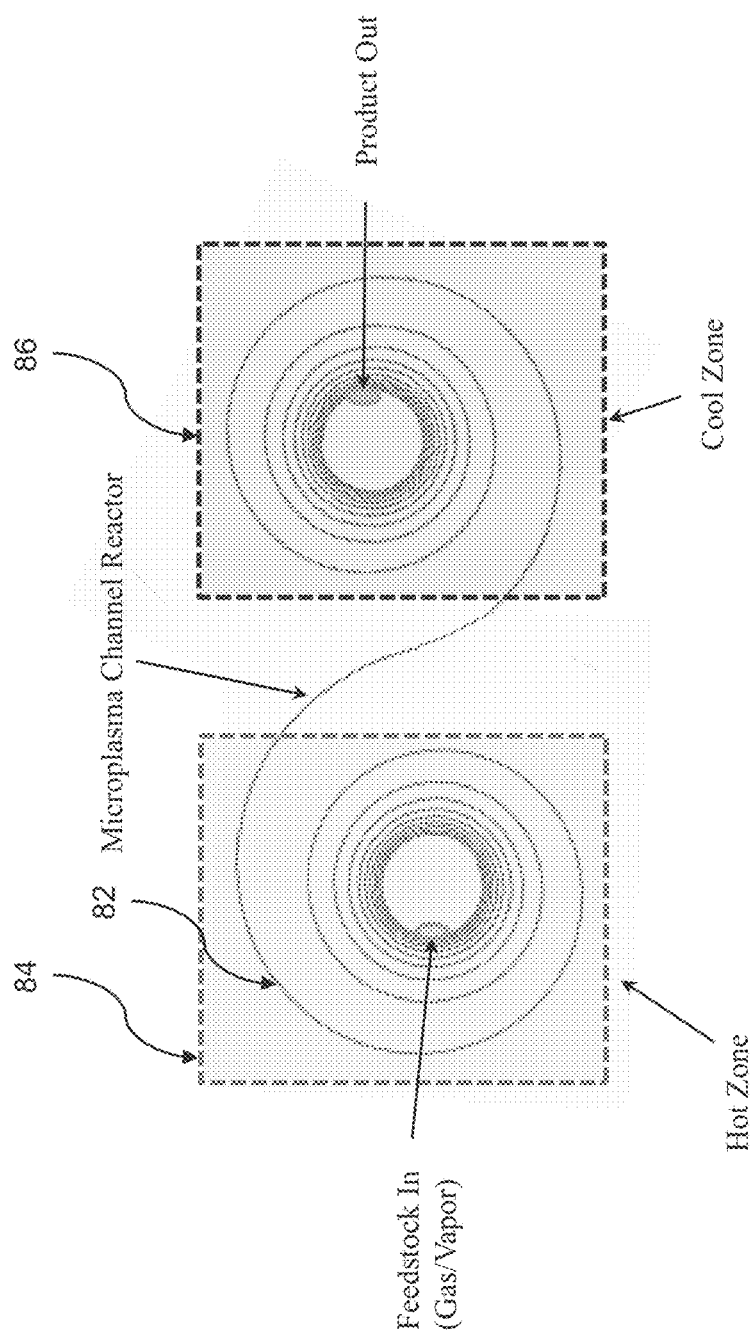
FIG. 7 illustrates an embodiment of the invention in which the microchannel has the form of a Cornu spiral.

Reactors of the invention can be realized in a variety of geometries designed to optimize: 1) the introduction and removal of water vapor to and from the feedstock and effluent, respectively; 2) the dissociation of the water vapor into hydrogen and oxygen, and 3) the separation of hydrogen from oxygen, if desired. FIG. 7 shows an embodiment of the invention in which the microchannels 82 are in the form of a Cornu spiral in which the coiled heated region 84 at left is the region in which steam is produced from water and, in the coiled, cooled region 86 at right, the channels 82 are cooled so that excess (unreacted) water is removed from the hydrogen and oxygen which both have much higher vapor pressures at a given temperature than does water vapor. One skilled in the art will recognize other variations on the structure of FIG. 7 such as coiling multiple microchannels simultaneously and providing multiple pathways (not simply one) between the heated and cooled regions on the chip.

In addition to hydrogen fueling stations, artisans will appreciate that methods and systems of the invention have a variety of applications that are enabled by the efficiency of the present methods and systems for the dissociation of water into hydrogen. One example is the generation of hydrogen for the commercial and residential heating of devices such as room heaters, stoves, and water heaters. Currently, water heaters are generally powered electrically or by natural gas. The former is not efficient because the heating coils function through resistive heating. Natural gas is an efficient heating source but, of course, is a carbon-based, nonrenewable fuel. Furthermore, if one folds into the cost calculations the environmental and economic penalty for the transportation and storage of natural gas, then this fuel becomes less attractive. Furthermore, the safety issues associated with the transport of natural gas is another consideration. Explosions due to gas leaks are all too common in the U.S.—another aspect of the overall cost of this technology to society. It must also be noted that hydrogen has an HHV that is almost four times larger than that for natural gas. Therefore, small microchannel plasma reactors can be situated at the base of a conventional 40 gallon water heater and the water required for the generator can be supplied by a tap on the cold water line supplying the water heater. Such low cost systems would provide an environmentally-friendly, clean source of heat for water heaters. The same comments can be made regarding ovens and stove tops in commercial ovens, as well as large ovens designed for industrial chemical production.

Figure 8:
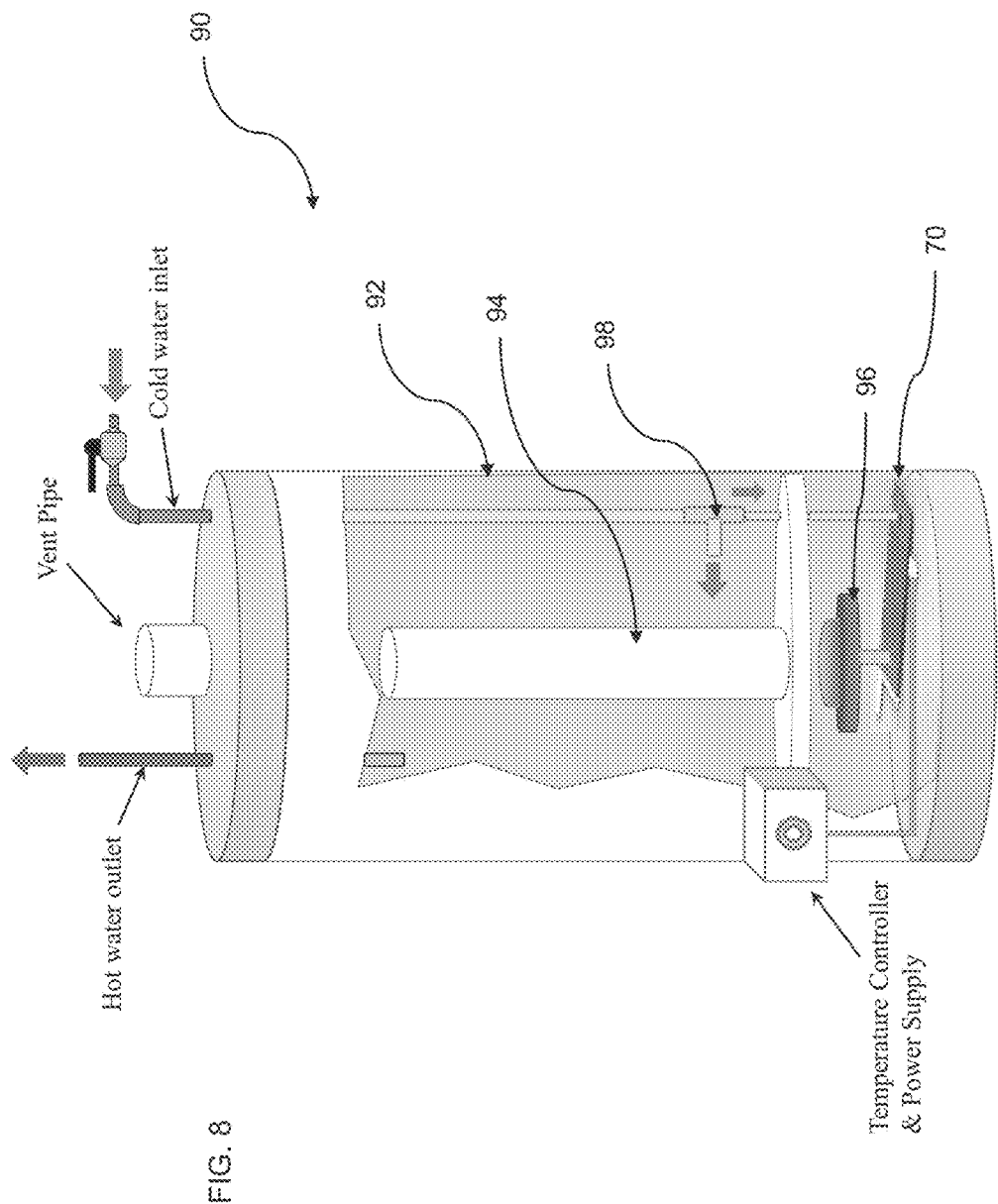
FIG. 8 illustrates a preferred embodiment water heater device.

FIG. 8 illustrates an exemplary heating system 90 in the form of a water heater. The water heater 90 of the preferred embodiment is a tank style heater, with an insulated tank 92 holding water that is heated therein by a heat exchanger 94. A burner 96 burns a mixture of hydrogen and oxygen gases generated by a microplasma chip (or chips) 70 in accordance with FIGS. 6A and 6B. A valve 98 that supplies cold water to the tank 92 also provides a supply of water to the chip(s) 70 through a tap on the cold water inlet. Other parts of the water heater 90 are conventional, including a cold water inlet, temperature control to control the actuation of the burner, and a hot water outlet.

Such as point of production system is very advantageous. Hydrogen (and oxygen) is generated at the point-of-use, as opposed to producing it remotely and transporting it long distances. Therefore, the amount of hydrogen generated is only that required for the specific application, and is produced at the water heater (or oven) itself. Another asset of this technology is that the fuel is generated from water which is, perhaps, the ultimate environmentally-friendly fuel.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for dissociating water into hydrogen and oxygen, comprising:
   introducing water vapor into a microchannel plasma array, wherein the microchannel plasma array comprises a plurality of microchannels isolated from electrodes via dielectric, wherein the microchannels in the array are arranged for a dielectric barrier discharge plasma excitation in the microchannels;
   applying electrical power to the microchannel plasma array to create a plasma chemical reaction of the water vapor in the microchannels of the microchannel plasma array and create hydrogen and/or oxygen gas; and
   collecting dissociated hydrogen and/or oxygen gas at an output of the microchannel plasma array.

2. The method of claim 1, wherein said introducing comprises introducing the water vapor entrained in a carrier gas.

3. The method of claim 2, wherein said introducing creates a flow rate of the water vapor entrained in gas of ~100 sccm and ~100 slm at a pressure between 10 Torr and 10 bar, and said applying electrical power comprises applying ~1-100 W of power per microchannel plasma chip.

4. The method of claim 2, wherein the carrier gas is one of He, Ne, or Ar.

5. The method of claim 1, wherein said introducing comprises introducing the water vapor directly into the microchannel plasma array without separately introducing carrier gas to entrain the water vapor.

6. The method of claim 5, further comprising heating water to produce steam and introducing the steam as the water vapor directly into the microchannel plasma array.

7. The method of claim 6, further comprising cooling a terminus of the microchannel plasma array to obtain unreacted water vapor and recycling the unreacted water vapor for said heating water to produce steam.

8. The method of claim 5, wherein said introducing creates a flow rate of the water vapor in one microchannel array of ~0.2 mL/min to ~5 L/min at a pressure of ~11.6 Torr to more than one atmosphere, and said applying electrical power comprises applying ~1-50 W of power.

9. The method of claim 1, further comprising a hydrophobic dielectric film coating said plurality of microchannels.

10. The method of claim 1, wherein said water vapor comprises steam.

11. The method of claim 1, wherein the microchannel plasma array comprises aluminum electrodes buried in nanoporous aluminum oxide.

\* \* \* \* \*